US012627757B2

(12) United States Patent
Amihood et al.

(10) Patent No.: US 12,627,757 B2
(45) Date of Patent: May 12, 2026

(54) HAND-GRIP LOCATION DETECTION USING ULTRASOUND

(71) Applicant: Google LLC, Mountain View, CA (US)

(72) Inventors: Patrick M. Amihood, Palo Alto, CA (US); Octavio Ponce Madrigal, Mountain View, CA (US); Anton Heistser, Munich (DE)

(73) Assignee: Google LLC, Mountain View, CA (US)

( * ) Notice: Subject to any disclaimer, the term of this patent is extended or adjusted under 35 U.S.C. 154(b) by 348 days.

(21) Appl. No.: 18/556,047

(22) PCT Filed: May 28, 2021

(86) PCT No.: PCT/US2021/034985
§ 371 (c)(1),
(2) Date: Oct. 18, 2023

(87) PCT Pub. No.: WO2022/250703
PCT Pub. Date: Dec. 1, 2022

(65) Prior Publication Data
US 2024/0205326 A1     Jun. 20, 2024

(51) Int. Cl.
*H04M 1/72454*      (2021.01)
*H04M 1/60*         (2006.01)

(52) U.S. Cl.
CPC ..... *H04M 1/72454* (2021.01); *H04M 1/6008* (2013.01); *H04M 1/6016* (2013.01); *H04M 2250/12* (2013.01)

(58) Field of Classification Search
CPC .......... H04M 1/72454; H04M 1/6008; H04M 1/6016; H04M 2250/12; H04M 1/03;
(Continued)

(56) References Cited

U.S. PATENT DOCUMENTS

| 3,522,764 A | 8/1970 | Biber et al. |
| 5,729,604 A | 3/1998 | Van Schyndel |
| (Continued) | | |

FOREIGN PATENT DOCUMENTS

| CN | 103049118 | 1/2016 |
| CN | 109194899 | 1/2019 |
| (Continued) | | |

OTHER PUBLICATIONS

"International Search Report and Written Opinion", Application No. PCT/US2021/034985, Feb. 22, 2022, 11 pages.
(Continued)

*Primary Examiner* — Angelica Perez
(74) *Attorney, Agent, or Firm* — Colby Nipper PLLC

(57)     ABSTRACT

Techniques and apparatuses are described that implement hand-grip location detection using ultrasound. In particular, an ultrasonic sensor determines a location that a user's hand grips a user device. While gripping the user device, the hand creates an additional aperture area, which amplifies ultrasonic signals that are received by one or more transducers of the ultrasonic sensor that are proximate to the user's hand. By analyzing the amplitude (or power) of received ultrasonic signals, the ultrasonic sensor can detect if the user's hand is proximate to a particular transducer. In some implementations, the ultrasonic sensor utilizes speakers and/or microphones that are present within the user device. In this way, the ultrasonic sensor can have a relatively small footprint and fit within space-constrained devices.

20 Claims, 10 Drawing Sheets

(58) Field of Classification Search
CPC . G06F 3/03; G06F 3/017; G01S 15/04; G01S 5/18; G01S 15/88; G01S 7/527; G01S 7/523
See application file for complete search history.

(56) References Cited

U.S. PATENT DOCUMENTS

| | | | |
|---|---|---|---|
| 6,104,808 | A | 8/2000 | Alameh et al. |
| 6,542,436 | B1 | 4/2003 | Myllyla |
| 7,801,315 | B2 | 9/2010 | Watanabe et al. |
| 9,665,784 | B2 | 5/2017 | Derakhshani et al. |
| 2012/0051548 | A1 | 3/2012 | Visser et al. |
| 2013/0194208 | A1* | 8/2013 | Miyanaka ............... G06F 3/043 345/173 |
| 2014/0198620 | A1* | 7/2014 | Prausse ................. G01S 15/931 367/100 |
| 2015/0142426 | A1 | 5/2015 | Song et al. |
| 2017/0300205 | A1 | 10/2017 | Villa et al. |
| 2017/0357440 | A1* | 12/2017 | Tse ......................... G06F 3/0482 |
| 2018/0129355 | A1* | 5/2018 | Lynn ..................... G06F 3/0227 |
| 2019/0354210 | A1* | 11/2019 | Akhbari ................ G06F 3/0416 |
| 2020/0292656 | A1* | 9/2020 | Lvov ........................ G01S 11/16 |
| 2021/0149519 | A1* | 5/2021 | Sheng ................... G06F 3/0416 |
| 2022/0342062 | A1* | 10/2022 | Hardy ..................... G01S 15/42 |

FOREIGN PATENT DOCUMENTS

| | | |
|---|---|---|
| JP | 2017072943 | 4/2017 |
| JP | 2017072943 A * | 4/2017 |
| WO | 2022250703 | 12/2022 |

OTHER PUBLICATIONS

Kim, et al., "Towards grip sensing for commodity smartphones through acoustic signature", Sep. 2017, pp. 105-108.
Lai, et al., "A Smart Spoofing Face Detector by Display Features Analysis", Jul. 2016, 15 pages.
Ming, et al., "A Survey On Anti-Spoofing Methods for Face Recognition with RGB Cameras of Generic Consumer Devices", Oct. 8, 2020, 53 pages.
Pinto, et al., "Video-Based Face Spoofing Detection through Visual Rhythm Analysis", Aug. 2012, 8 pages.
Wang, et al., "Hand Gesture Recognition Based on Active Ultrasonic Sensing of Smartphone: A Survey", Aug. 2019, 26 pages.
"Foreign Office Action", EP Application No. 21735052.9, Jun. 27, 2025, 5 pages.
"International Preliminary Report on Patentability", Application No. PCT/US2021/034985, Nov. 21, 2023, 8 pages.

* cited by examiner

Radio-
Frequency
Signal 112

User Device
102

Grip
106

Haptic Sensor
110-1

Prompt
108

User
104

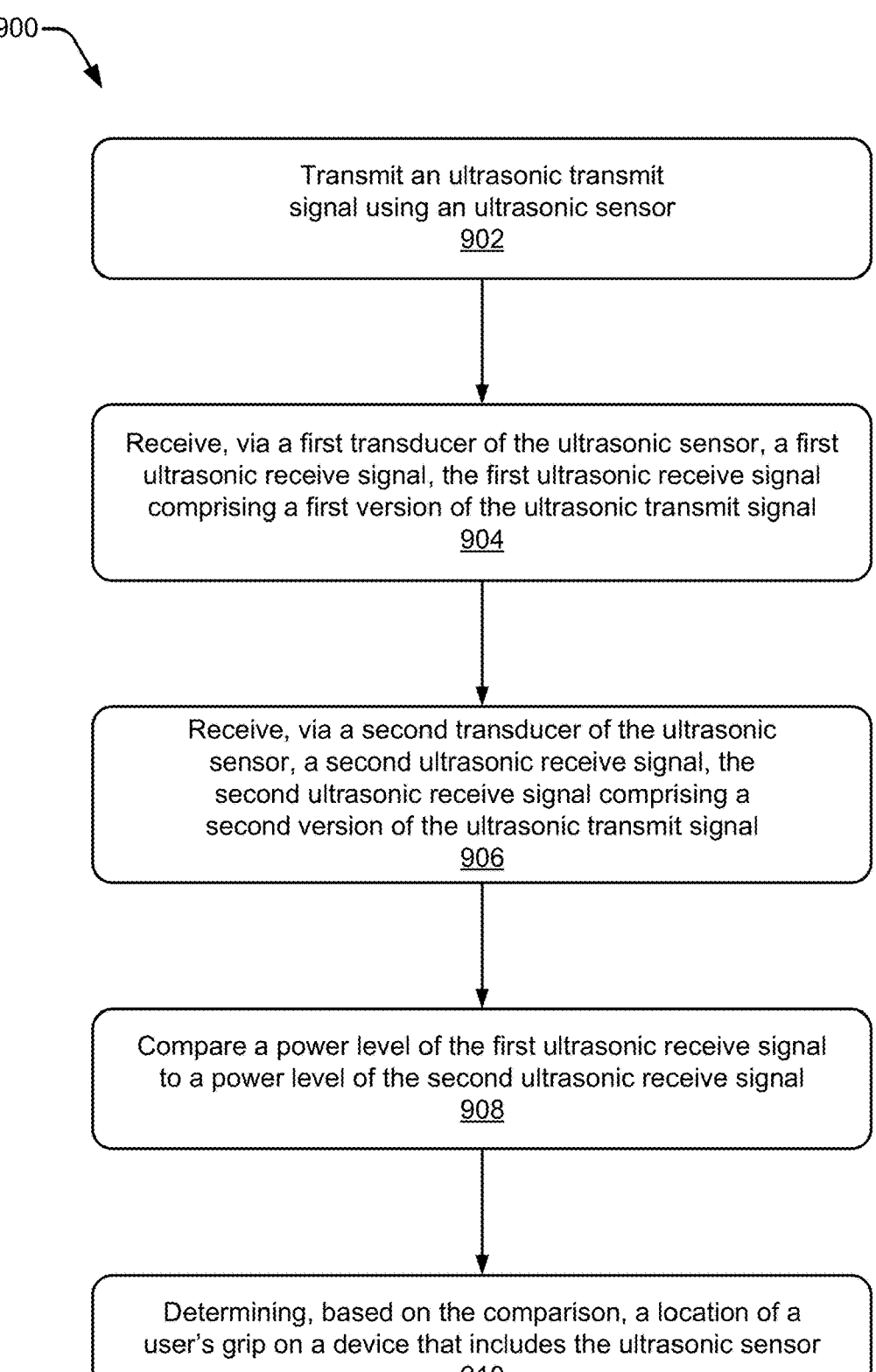

900

Transmit an ultrasonic transmit
signal using an ultrasonic sensor
902

Receive, via a first transducer of the ultrasonic sensor, a first
ultrasonic receive signal, the first ultrasonic receive signal
comprising a first version of the ultrasonic transmit signal
904

Receive, via a second transducer of the ultrasonic
sensor, a second ultrasonic receive signal, the
second ultrasonic receive signal comprising a
second version of the ultrasonic transmit signal
906

Compare a power level of the first ultrasonic receive signal
to a power level of the second ultrasonic receive signal
908

Determining, based on the comparison, a location of a
user's grip on a device that includes the ultrasonic sensor
910

FIG. 9

HAND-GRIP LOCATION DETECTION USING ULTRASOUND

RELATED APPLICATION(S)

This application is a national stage entry of International Application No. PCT/US2021/034985, filed May 28, 2021, the disclosure of which is incorporated herein by reference in its entirety.

BACKGROUND

A user's grip affects a degree to which the user can interact with an interface of a computing device. Some grips can make it easier to access a top or bottom portion of a display. Other grips can make it easier for a user to perform complex gestures, such as a two-finger pinch to zoom in or zoom out. Still other grips can result in the user accidentally occluding a radio-frequency antenna or camera. Furthermore, the user's grip can change over time. Without knowledge of how it is being held, the computing device is unable to implement features that can otherwise improve the user experience for a variety of different hand grips.

SUMMARY

Techniques and apparatuses are described that implement hand-grip location detection using ultrasound. In particular, an ultrasonic sensor determines a location that a user's hand grips a user device. While gripping the user device, the hand creates an additional aperture area, which amplifies ultrasonic signals that are received by one or more transducers of the ultrasonic sensor that are proximate to the user's hand. By analyzing the amplitude (or power) of received ultrasonic signals, the ultrasonic sensor can detect if the user's hand is proximate to a particular transducer. In some implementations, the ultrasonic sensor utilizes speakers and/or microphones that are present within the user device. In this way, the ultrasonic sensor can have a relatively small footprint and fit within space-constrained devices.

Aspects described below include a method performed by an ultrasonic sensor for hand-grip location detection using ultrasound. The method includes transmitting an ultrasonic transmit signal using the ultrasonic sensor. The method also includes receiving, via a first transducer of the ultrasonic sensor, a first ultrasonic receive signal. The first ultrasonic receive signal comprises a first version of the ultrasonic transmit signal. The method additionally includes receiving, via a second transducer of the ultrasonic sensor, a second ultrasonic receive signal. The second ultrasonic receive signal comprises a second version of the ultrasonic transmit signal. The method further includes comparing a power level of the first ultrasonic receive signal to a power level of the second ultrasonic receive signal. Based on the comparison, the method further includes determining a location of a user's grip on a user device that includes the ultrasonic sensor.

Aspects described below also include an apparatus comprising an ultrasonic sensor configured to perform any of the described methods.

Aspects described below include a computer-readable storage media comprising computer-executable instructions that, responsive to execution by a processor, cause an ultrasonic sensor to perform any one of the described methods.

Aspects described below also include a system with means for performing hand-grip location detection using ultrasound.

BRIEF DESCRIPTION OF DRAWINGS

Apparatuses for and techniques implementing hand-grip location detection using ultrasound are described with reference to the following drawings. The same numbers are used throughout the drawings to reference like features and components:

FIG. 9 illustrates an example method for performing operations of an ultrasonic sensor capable of hand-grip location detection using ultrasound.

DETAILED DESCRIPTION

Overview

A user's grip affects a degree to which the user can interact with an interface of a computing device. Some grips can make it easier to access a top or bottom portion of a display. Other grips can make it easier for a user to perform complex gestures, such as a two-finger pinch to zoom-in or zoom-out. Still other grips can result in the user accidentally occluding a radio-frequency antenna or camera. Furthermore, the user's grip can change over time. Without knowledge of how it is being held, the computing device is unable to implement features that can otherwise improve the user experience for a variety of different hand grips.

To detect the user's grip, some techniques integrate additional sensors within the computing device. An example technique uses multiple sensors distributed around the computing device to detect a location of the user's hand. These sensors can include vibration sensors or proximity detectors, such as capacitive sensors. In order to detect a variety of user grips, large quantities of these sensors can be used. This can create a significant footprint, which can be challenging to integrate within small, mobile devices. Other sensors, such as an inertial sensor, can detect that the computing device is being held but is unable to determine a location of the user's grip.

To address these problems, this document describes techniques and devices that implement hand-grip location detection using ultrasound. In particular, an ultrasonic sensor determines a location that a user's hand grips a user device. While gripping the user device, the hand creates an additional aperture area, which amplifies ultrasonic signals that are received by one or more transducers of the ultrasonic sensor that are proximate to the user's hand. By analyzing the amplitude (or power) of received ultrasonic signals, the ultrasonic sensor can detect if the user's hand is proximate to a particular transducer. In some implementations, the ultrasonic sensor utilizes speakers and/or microphones that are present within the user device. In this way, the ultrasonic sensor can have a relatively small footprint and fit within space-constrained devices.

Example Environment

Figure 1:
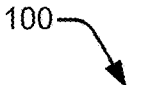
FIG. 1 illustrates an example environment in which hand-grip location detection using ultrasound can be implemented.

FIG. 1 illustrates an example environment 100 in which hand-grip location detection can be implemented. In the environment 100, a user 104 holds a user device 102 using a particular grip 106. In this case, the user 104 orients the user device 102 in a portrait orientation, and the user 104's hand grips a bottom portion of the user device 102. Over time, the grip 106 can change. For example, the user 104's hand can grip a middle or top portion of the user device 102 while the user device 102 is in a portrait orientation. As another example, the user 104 can orient the user device 102 in a landscape orientation, and both hands of the user 104 can grip the sides of the user device 102.

Figure 2:
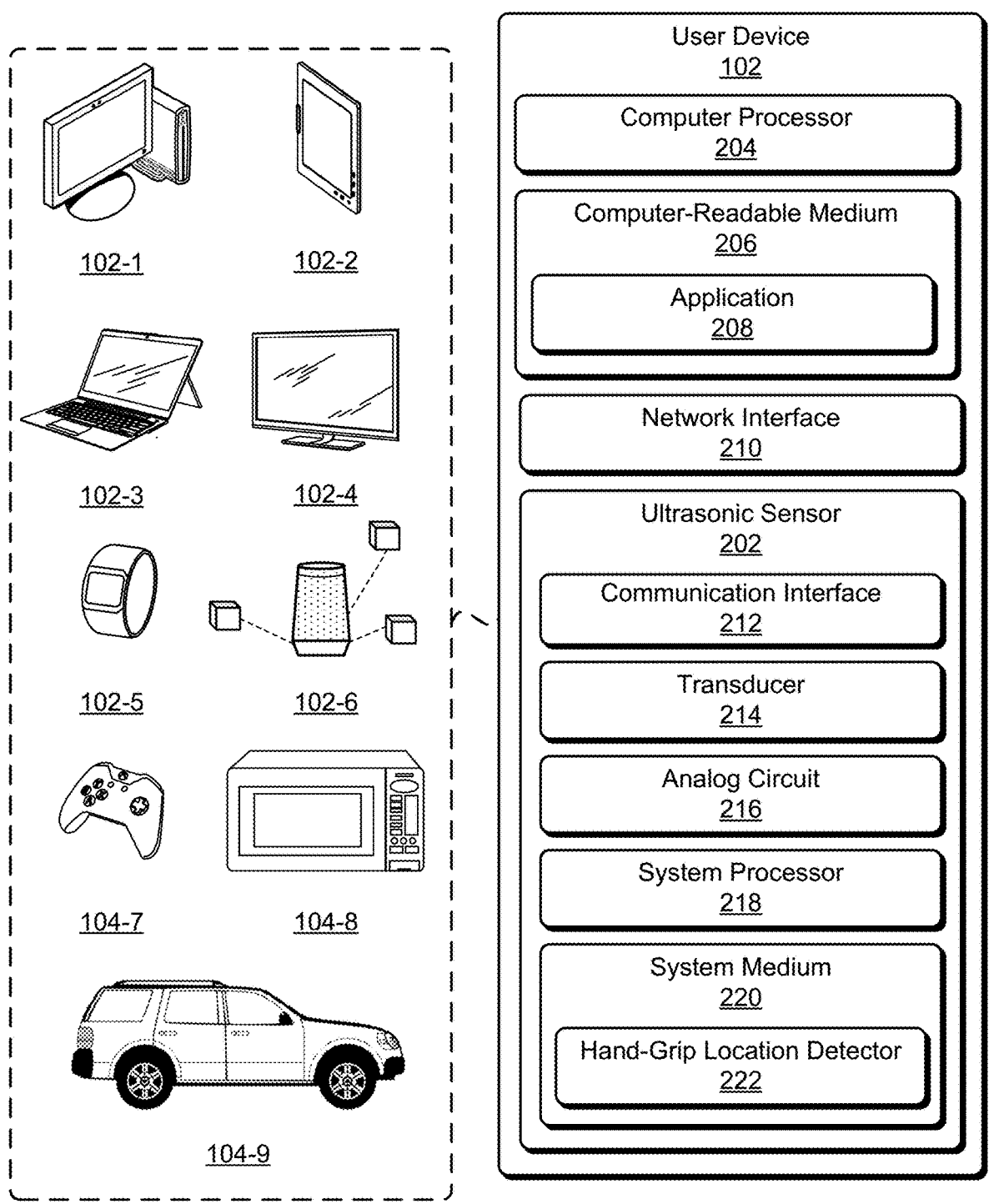
FIG. 2 illustrates an example ultrasonic sensor as part of a user device.
Figure 3:
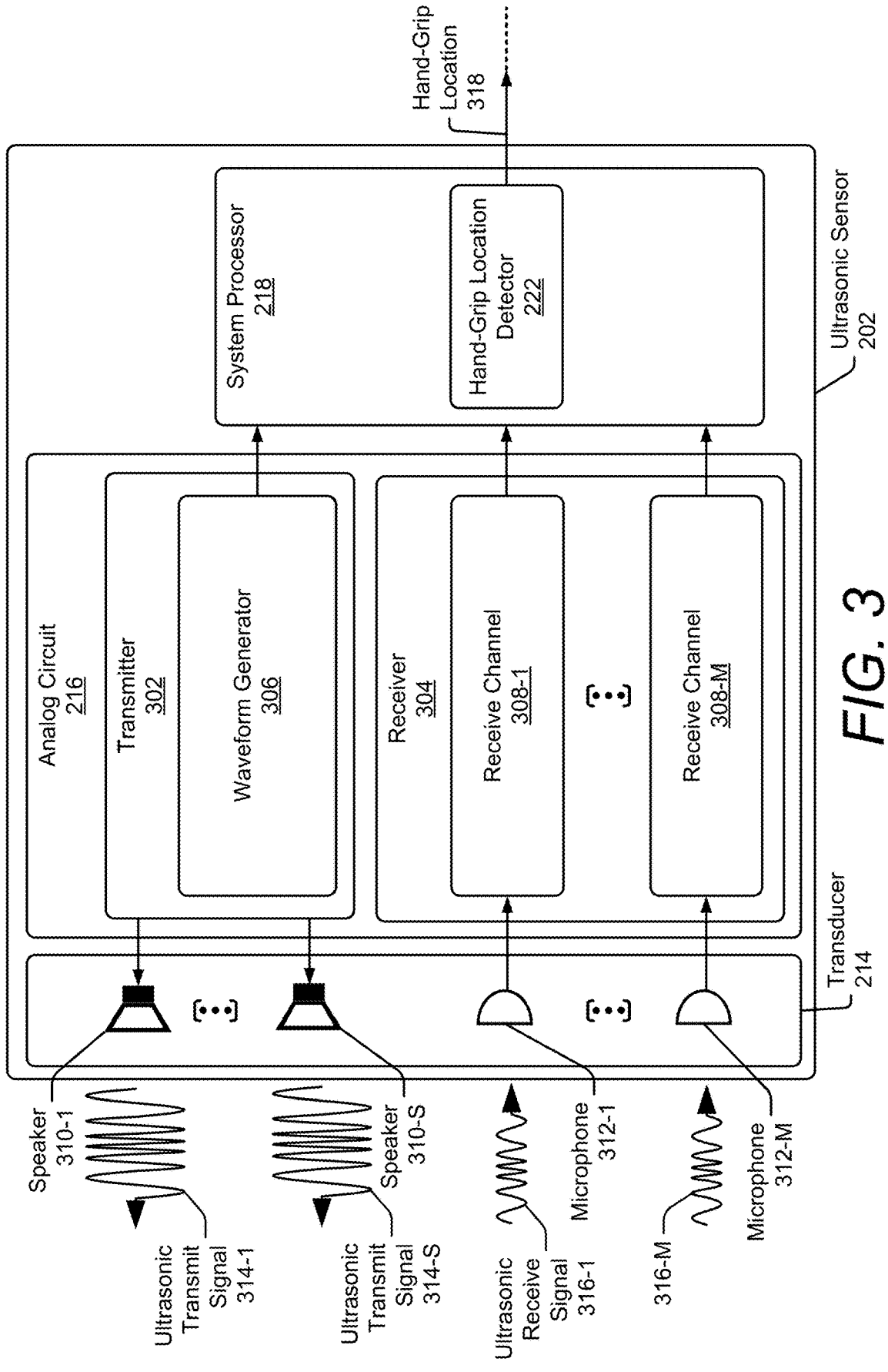
FIG. 3 illustrates an example ultrasonic sensor for hand-grip location detection.

The user device 102 detects a location that the user 104 grips the user device 102 using ultrasound, as further described with respect to FIGS. 2 and 3. With this knowledge, the user device 102 can improve the user experience and performance of the user device 102. As a first example, the user device 102 customizes the position of a prompt 108 presented on a display of the user device 102. In particular, the prompt 108 is positioned closer to the user 104's hand in order to make it easier for the user 104 to interact with the prompt 108. The prompt 108 can include content or controls. Example content can include a web page or a text document. Example controls can include a virtual keyboard or controls associated with an application (e.g., stop a timer, accept a phone call, reply to a text message). In general, the user device 102 can dynamically optimize the user interface based on a location of the user 104's grip 106.

As a second example, the user device 102 enables a haptic sensor 110 that is in a position associated with the grip 106. Optionally, the user device 102 can disable other haptic sensors that are in positions not likely to be sensed by the user 104 based on the user 104's grip 106 (e.g., haptic sensors that are near a top of the user device 102). In this way, the user device 102 can activate haptic sensors that are likely to be sensed by the user 104 and deactivate other haptic sensors that are unlikely to be sensed by the user 104.

As a third example, the user device 102 can change the operation of the other components within the user device 102 to improve performance based on the grip 106. These components can include a radio-frequency component, an audio component, a camera, or other sensors. Example radio-frequency components include a wireless communication module (e.g., for cellular, Bluetooth™, ultra-wideband (UWB), or Wi-Fi™ communications), a Global Navigation Satellite System (GNSS), or a radar system. To improve the performance of the radio-frequency component based on the location of the grip 106, the user device 102 can increase a transmit power level for transmitting a radio-frequency signal 112 responsive to determining that the grip 106 is not proximate to an antenna used to transmit the radio-frequency signal 112. The user device 102 can also configure the radio-frequency component to use unobstructed antennas instead of antennas that are at least partially obstructed by the grip 106.

Example audio components can include speakers or microphones. In the case that the grip 106 occludes one or more speakers, the user device 102 can adjust the operation of the speakers to enhance the audio quality while the speaker is partially occluded. Additionally, if the user 104's grip 106 covers a camera or another sensor, the user device 102 can notify the user 104 of this occlusion. In response, the user 104 can change their grip 106 to enable that component to operate normally.

In other examples, the user device 102 can activate other processes or other sensor responsive to detecting the user 104's grip 106. For example, the user device 102 can trigger a camera to turn on and activate face authentication. In this way, the user device 102 can increase responsiveness to improve the user experience. The user device 102 can also provide information to the user 104 regarding the grip 106. For example, the user device 102 can provide ergonomic suggestions to improve the grip 106. The user device 102 is further described with respect to FIG. 2.

FIG. 2 illustrates an ultrasonic sensor 202 as part of the user device 102. The user device 102 is illustrated with various non-limiting example devices, including a desktop computer 102-1, a tablet 102-2, a laptop 102-3, a television 102-4, a computing watch 102-5, a home automation and control system 102-6, a gaming system 102-7, a microwave 102-8, and a vehicle 102-9. Other devices may also be used, such as a home service device, a smart thermostat, a security camera, a baby monitor, a Wi-Fi™ router, a drone, a trackpad, a drawing pad, a netbook, an e-reader, a wall display, and another home appliance. Note that the user device 102 can be wearable, non-wearable but mobile, or relatively immobile (e.g., desktops and appliances). The ultrasonic sensor 202 can be used as a stand-alone ultrasonic sensor or used with, or embedded within, many different devices or peripherals, such as in control panels that control home appliances and systems, in automobiles, or as an attachment to a laptop computer.

The user device 102 includes one or more computer processors 204 and at least one computer-readable medium 206, which includes memory media and storage media. Applications and/or an operating system (not shown) embodied as computer-readable instructions on the computer-readable medium 206 can be executed by the computer processor 204 to provide some of the functionalities described herein. The computer-readable medium 206 also includes an application 208 or setting, which performs operations based on information regarding the user 104's grip 106, which is provided by the ultrasonic sensor 202.

The user device 102 can also include a network interface 210 for communicating data over wired, wireless, or optical networks. For example, the network interface 210 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The user device 102 may also include a display (not shown).

The ultrasonic sensor 202 includes a communication interface 210 to transmit ultrasonic sensor data to a remote device, though this need not be used when the ultrasonic sensor 202 is integrated within the user device 102. In general, the ultrasonic sensor data provided by the communication interface 210 is in a format usable by the application 208. The ultrasonic sensor data can include information about whether or not the ultrasonic sensor 202 detects the user 104's grip 106 and/or a location of the user 104's grip 106.

The ultrasonic sensor 202 includes at least one transducer 214, which can convert electrical signals into sound waves. The transducer 214 can also detect and convert sound waves into electrical signals. These electrical signals and sound waves may include frequencies in an ultrasonic range and/or an acoustic range, either of which may be used for the detection of user presence.

A frequency spectrum (e.g., range of frequencies) that the transducer 214 uses to generate an ultrasonic signal can include frequencies from a low-end of the acoustic range to a high-end of the ultrasonic range, 20 hertz (Hz) to 2 megahertz (MHz) or include frequencies in the ultrasonic range, 20 kilohertz (kHz) to 2 MHZ. In some cases, the frequency spectrum can be divided into multiple sub-spectrums that have similar or different bandwidths. For example, different frequency sub-spectrums may include 30 to 500 kHz, 30 to 70 kHz, 80 to 500 kHz, 1 to 2 MHZ, 20 to 24 kHz, 24 to 48 kHz, 26 to 29 kHz, 31 to 34 kHz, or 33 to 36 KHz.

These frequency sub-spectrums can be contiguous or disjoint, and the transmitted signal can be modulated in phase and/or frequency. To achieve coherence, multiple frequency sub-spectrums (contiguous or not) that have a same bandwidth may be used by the transducer 214 to generate multiple ultrasonic signals, which are transmitted simultaneously or separated in time. In some situations, multiple contiguous frequency sub-spectrums may be used to transmit a single ultrasonic signal, thereby enabling the ultrasonic signal to have a wide bandwidth.

In an example implementation, the transducer 214 of the ultrasonic sensor 202 has a monostatic topology. With this topology, the transducer 214 can convert the electrical signals into sound waves and convert sound waves into electrical signals (e.g., can transmit or receive ultrasonic signals). Example monostatic transducers may include piezoelectric transducers, capacitive transducers, and micromachined ultrasonic transducers (MUTs) that use microelectromechanical systems (MEMS) technology.

Alternatively, the transducer 214 can be implemented with a bistatic topology, which includes multiple transducers located at different positions on the user device 102. In this case, a first transducer converts the electrical signal into sound waves (e.g., transmits ultrasonic signals), and a second transducer converts sound waves into an electrical signal (e.g., receives the ultrasonic signals). An example bistatic topology can be implemented using at least one speaker and at least one microphone of the user device 102. The speaker and microphone can be dedicated for operations of the ultrasonic sensor 202. Alternatively, the speaker and microphone can be shared by both the user device 102 and the ultrasonic sensor 202.

The ultrasonic sensor 202 includes at least one analog circuit 216, which includes circuitry and logic for conditioning electrical signals in an analog domain. The analog circuit 216 can include a waveform generator, analog-to-digital converters, amplifiers, filters, mixers, phase shifters, and switches for generating and modifying electrical signals. In some implementations, the analog circuit 216 includes other hardware circuitry associated with the speaker or microphone.

The ultrasonic sensor 202 also includes one or more system processors 218 and at least one system medium 220 (e.g., one or more computer-readable storage media). The system processor 218 processes the electrical signals in a digital domain. The system medium 220 includes a hand-grip location detector 222. The hand-grip location detector 222 can be implemented using hardware, software, firmware, or a combination thereof. In this example, the system processor 218 implements the hand-grip location detector 222. The hand-grip location detector 222 processes responses (e.g., electrical signals) from the transducer 214 to determine a location of the user 104's grip 106. In particular, the hand-grip location detector 222 analyzes the received power from multiple transducers 214 at relatively close ranges to the transducer 214 to estimate a relative position of the user's 104 hand. The relative position can be used to distinguish between different types of grips.

In some implementations, the user device 102 can perform other techniques or use other sensors for detecting hand-grip locations that do not use ultrasound. In this case, the ultrasonic sensor 202 can verify the results determined using these other techniques to further increase confidence. The ultrasonic sensor 202 is further described with respect to FIG. 3.

FIG. 3 illustrates an example implementation of the ultrasonic sensor 202. In the depicted configuration, the ultrasonic sensor 202 includes the transducer 214, the analog circuit 216, and the system processor 218. The analog circuit 216 is coupled between the transducer 214 and the system processor 218. The analog circuit 216 includes a transmitter 302 and a receiver 304. The transmitter 302 includes a waveform generator 306 coupled to the system processor 218. Although not shown, the transmitter 302 can include one or more transmit channels. The receiver 304 includes multiple receive channels 308-1 to 308-M, where M represents a positive integer. The receive channels 308-1 to 308-M are coupled to the system processor 218.

The transducer 214 is implemented with a bistatic topology, which includes at least one speaker and at least one microphone. In the depicted configuration, the transducer 214 includes multiple speakers 310-1 to 310-S and multiple microphones 312-1 to 312-M, where S represents a positive integer. The speakers 310-1 to 310-S are coupled to the transmitter 302, and the microphones 312-1 to 312-M are coupled to respective receive channels 308-1 to 308-M of the receiver 304.

Although the ultrasonic sensor 202 in FIG. 3 includes multiple speakers and multiple microphones, other implementations of the ultrasonic sensor 202 can include a single speaker and a single microphone, a single speaker and multiple microphones, multiple speakers and a single microphone, or other types of transducers capable of transmitting and/or receiving. In some implementations, the speakers 310-1 to 310-S and microphones 312-1 to 312-M can also operate with audible signals. For example, the user device 102 can play music through the speakers 310-1 to 310-S and detect the user 104's voice using the microphones 312-1 to 312-M.

During transmission, the transmitter 302 passes electrical signals to the speakers 310-1 to 310-S, which emit ultrasonic transmit signals 314-1 to 314-S, respectively. In particular, the waveform generator 306 generates the electrical signals, which can have similar waveforms (e.g., similar amplitudes, phases, and frequencies) or different waveforms (e.g., different amplitudes, phases, and/or frequencies). The waveform generator 306 also communicates the electrical signals to the system processor 218 for digital signal processing. The ultrasonic transmit signals 314-1 to 314-S may or may not be reflected by an object (e.g., the user 104).

During reception, the microphones 312-1 to 312-M receive ultrasonic receive signals 316-1 to 316-M, respectively. Relative phase differences, frequencies, and amplitudes between the ultrasonic receive signals 316-1 to 316-M and the ultrasonic transmit signals 314-1 to 314-S may vary due to the interaction of the ultrasonic transmit signals 314-1 to 314-S with a nearby object (e.g., the user 104's hand) or the external environment (e.g., path loss and noise sources). The ultrasonic receive signals 316-1 to 316-M represent versions of an ultrasonic transmit signal that propagates from one of the speakers 310-1 to 310-S to one of the microphones 312-1 to 312-M.

The system processor 218 includes the hand-grip location detector 222. The system processor 218 or the hand-grip location detector 222 can perform functions such as range compression, baseband processing, demodulation, and filtering. In general, the hand-grip location detector 222 accepts signals from the receive channels 308-1 and 308-M and analyzes these signals to determine a location of the user 104's grip 106 (e.g., to determine a hand-grip location 318), as further described with respect to FIG. 4.

Figure 4:
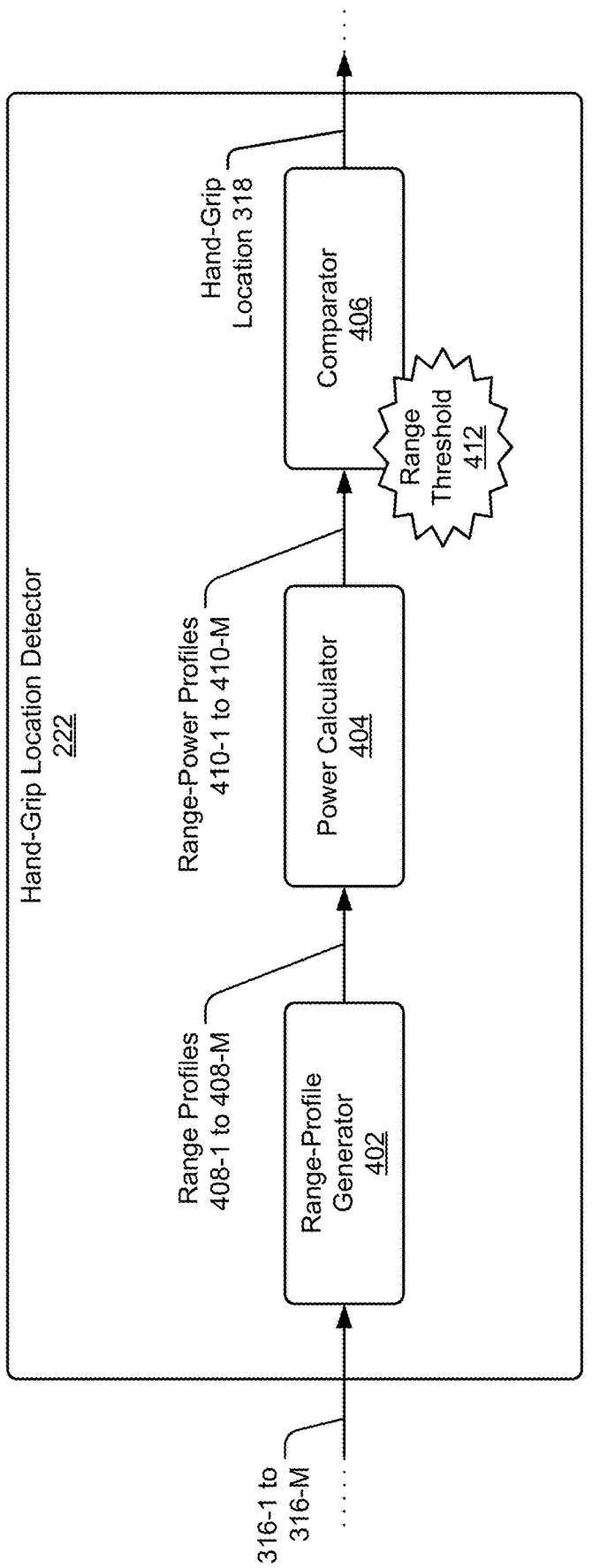
FIG. 4 illustrates an example scheme implemented by a hand-grip location detector for hand-grip location detection using ultrasound.

FIG. 4 illustrates an example scheme implemented by the hand-grip location detector 222 for hand-grip location detection using ultrasound. In the depicted configuration, the hand-grip location detector 222 includes a range-profile generator 402, an optional power calculator 404, and a comparator 406.

During operation, the range-profile generator 402 accepts the ultrasonic receive signals 316-1 to 316-M from the analog circuit 216. The range-profile generator 402 generates range profiles 408-1 to 408-M based on samples of the ultrasonic receive signals 316-1 to 316-M. As an example, the range-profile generator 402 applies a Fourier transform (e.g., a fast Fourier transform (FFT)) to each of the ultrasonic receive signals 316-1 to 316-M to generate the range profiles 408-1 to 408-M. The range profiles 408-1 to 408-M characterize amplitudes of the ultrasonic receive signals 316-1 to 316-M across a set of ranges (e.g., a set of distances or slant ranges).

The power calculator 404 generates range-power profiles 410-1 to 410-M based on the range profiles 408-1 to 408-M. In particular, the power calculator 404 computes power levels of the ultrasonic receive signals 316-1 to 316-M across the set of ranges based on the amplitudes within the range profiles 408-1 to 408-M. The range-power profiles 410-1 to 410-M characterize power levels of the ultrasonic receive signals 316-1 to 316-M across the set of ranges.

If the hand-grip location detector 222 includes the power calculator 404, the comparator 406 compares the power levels of the ultrasonic receive signals 316-1 to 316-M within a certain range (e.g., across ranges that are less than a range threshold 412). The range threshold 412 can be determined based on a size of the user device 102 and the positions of the microphones 312-1 to 312-M. As an example, the range threshold 412 can be approximately 20 centimeters (cm) or less for a user device 102 implemented as a smartphone. In some aspects, the range threshold 412 can be approximately 15 cm, 10 cm, or 5 cm. In general, the ultrasonic receive signals 316-1 to 316-M with larger amounts of power within the range threshold 412 indicate that the user 104's grip 106 is proximate to the corresponding microphones 312-1 to 312-M. By comparing the power levels across the range-power profiles 410-1 to 410-M, the comparator 406 can determine whether the user 104's grip 106 is closer to one or more of the microphones 312-1 to 312-M. In this way, the comparator 406 can determine the hand-grip location 318.

If the hand-grip location detector 222 does not include the power calculator 404, the comparator 406 can perform a similar comparison based on the amplitudes of the ultrasonic receive signals 316-1 to 316-M within the range profiles 408-1 to 408-M. Alternatively, the comparator 406 can perform a similar comparison based on signal-to-noise ratios associated with the ultrasonic receive signals 316-1 to 316-M.

In some implementations, the comparator 406 can also identify if the user 104 is not gripping the user device 102 by comparing the power levels, amplitudes, or signal-to-noise ratios of the ultrasonic signals 316-1 to 316-M to a threshold. If the power levels, amplitudes, or signal-to-noise ratios are less than the threshold within the range threshold 412, then the hand-grip location detector 222 determines that the user 104 is not gripping the user device 102.

Responsive to determining the hand-grip location 318, the hand-grip location detector 222 sends the hand-grip location 318 to the application 208. Based on hand-grip location 318, the application 208 can implement a variety of different features to improve the user experience, including those described with respect to FIG. 1. Example positions of the speakers 310-1 to 310-S and microphones 312-1 to 312-M are further described with respect to FIG. 5.

Figure 5:
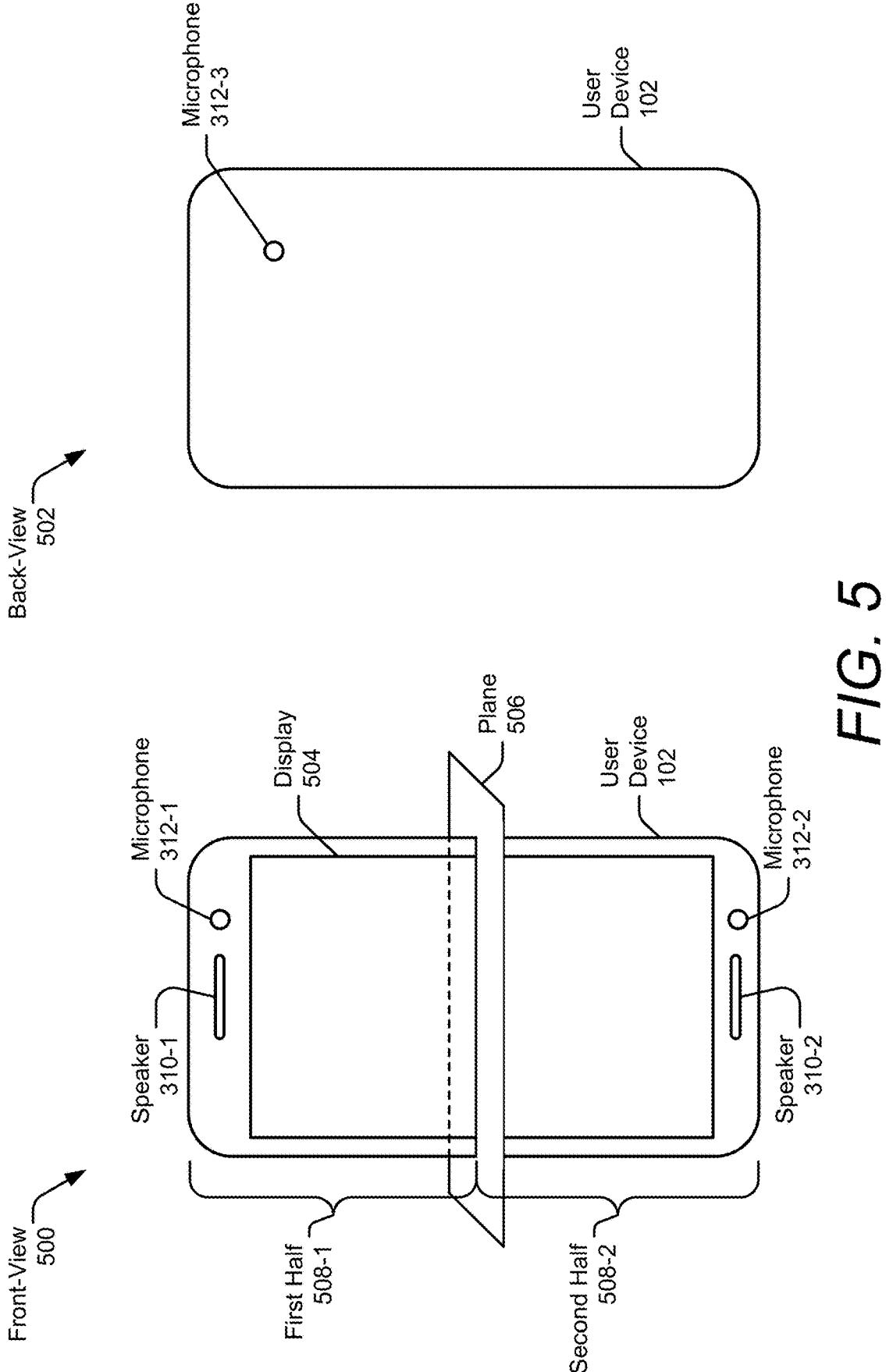
FIG. 5 illustrates example positions of speakers and microphones of a user device.

FIG. 5 illustrates example positions for speakers 310-1 and 310-2 and microphones 312-1 to 312-3 on a front-view 500 and a back-view 502 of the user device 102. Although the example user device 102 of FIG. 5 is shown to include two speakers 310-1 and 310-2 and three microphones 312-1 to 312-3, the ultrasonic sensor 202 may operate with one or more speakers and two or more of microphones at any given time.

As shown by the front-view 500, the user device 102 includes a display 504, the speakers 310-1 and 310-2, and the microphones 312-1 and 312-2. In this implementation, the speakers 310-1 and 310-2 and the microphones 312-1 and 312-2 are positioned on a same surface of the user device 102. In this case, this surface also includes the display 504.

The speaker 310-1 is positioned on a different side of the user device 102 than the speaker 310-2. For example, the speaker 310-1 is positioned on a top side of the user device 102, and the speaker 310-2 is positioned on a bottom side of the user device 102. Likewise, the microphone 312-1 is positioned on a different side of the user device 102 than the microphone 312-2. Consider a plane 506, which bisects the user device 102 in half. In this case, a first half 508-1 of the user device 102 includes the speaker 310-1 and the microphone 312-1. A second half 508-2 of the user device 102 includes the speaker 310-2 and the microphone 312-2.

As shown by the back-view 502, some implementations of the user device 102 can also include a microphone 312-3, which is positioned on an opposite side of the user device 102 relative to the display 504. In this case, the microphone 312-3 is closer to the microphone 312-1 than the microphone 312-2. As such, the microphone 312-3 is within the first half 508-1 of the user device 102.

In situations in which the ultrasonic sensor 202 can use multiple speakers, such as speakers 310-1 and 312-2, the ultrasonic sensor 202 can select a speaker that can provide a higher signal-to-noise ratio. The signal-to-noise ratio can be dependent upon performance characteristics of the speaker and/or a position of the speaker relative to the user 104's current grip 106.

In general, the positions of the microphones 312-1 to 312-3 are such that a user 104's grip 106 may at least be proximate to some or all of the microphones 312-1 to 312-3 at a given time. By placing at least some of the microphones 312-1 to 312-3 at different positions and/or different surfaces of the user device 102, the ultrasonic sensor 202 can detect a larger quantity of hand-grip locations 318 with better accuracy and granularity. A variety of different types of grips are further described with respect to FIGS. 6-8.

Hand-Grip Location Detection Using Ultrasound

Figure 6:
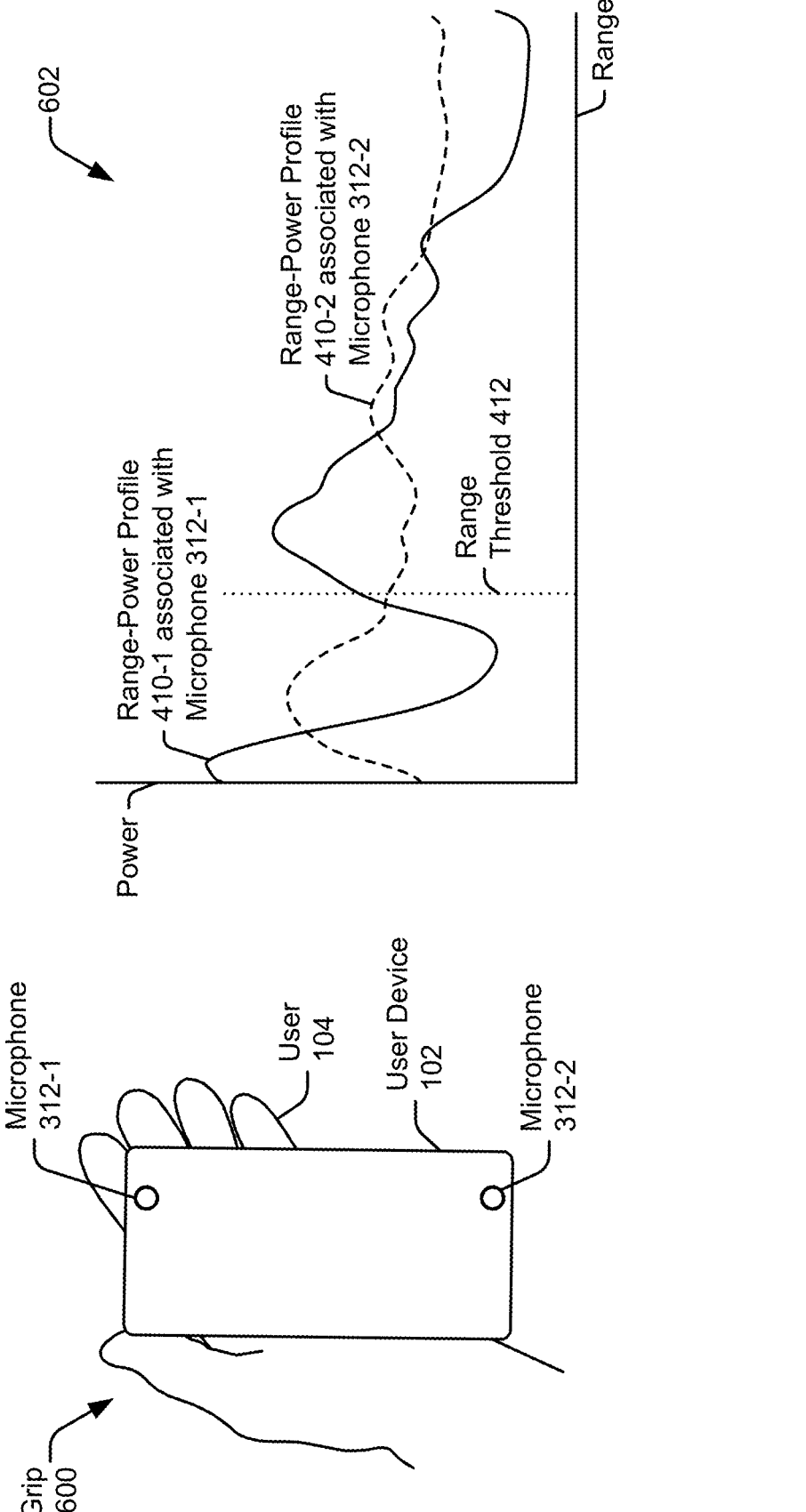
FIG. 6 illustrates an example grip and range-power profiles detected by an ultrasonic sensor performing hand-grip location detection using ultrasound.
Figure 7:
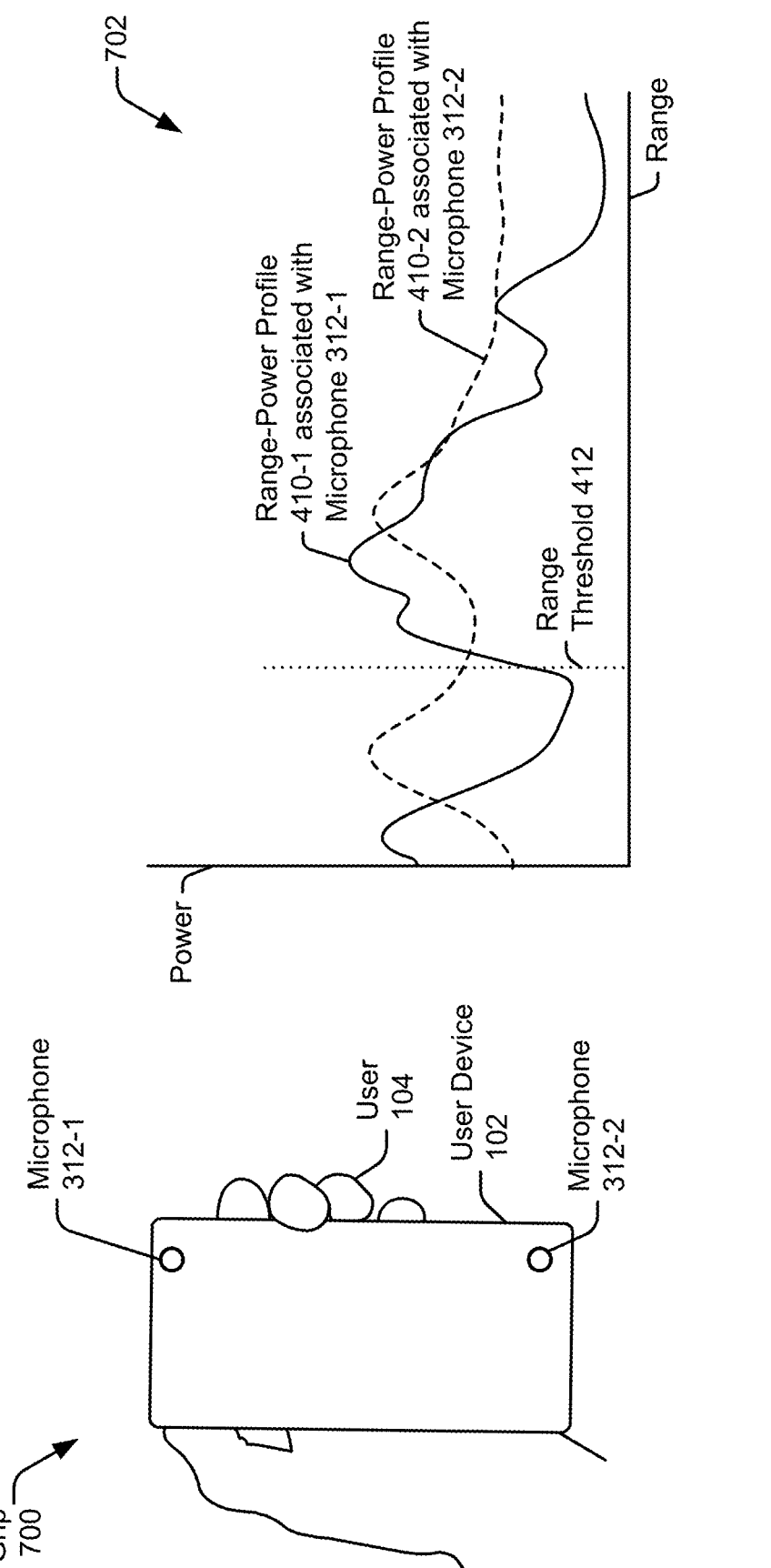
FIG. 7 illustrates another example grip and other range-power profiles detected by an ultrasonic sensor performance hand-grip location detection using ultrasound.
Figure 8:
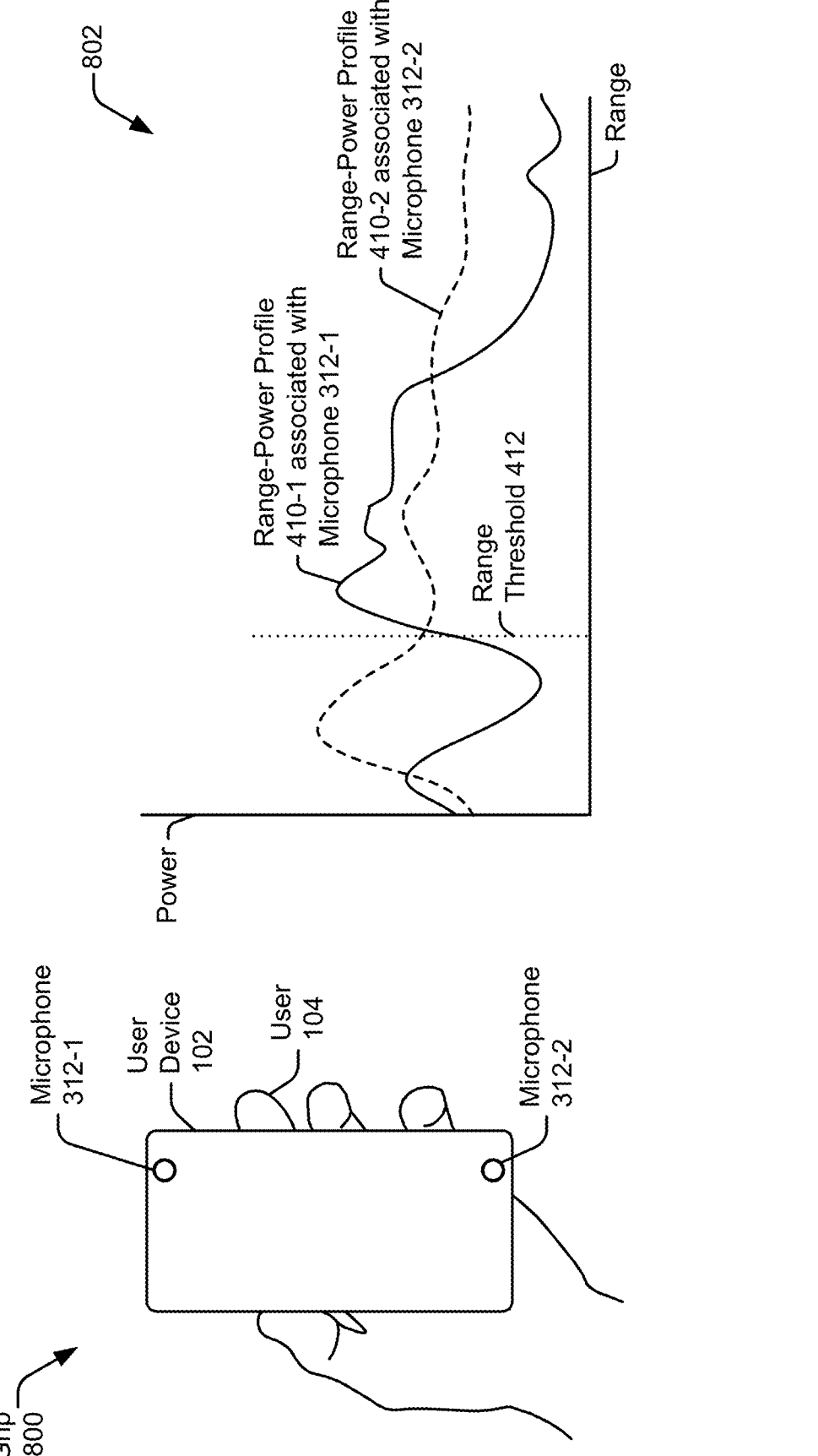
FIG. 8 illustrates an additional example grip and additional range-power profiles detected by an ultrasonic sensor performing hand-grip location detection using ultrasound.

FIGS. 6-8 depict different grips 106, which can be detected using the ultrasonic sensor 202. In these examples, the ultrasonic sensor 202 uses the microphones 312-1 and 312-2 to determine the hand-grip location 318.

In FIG. 6, the user 104 has a grip 600, which is located towards a top of the user device 102. For example, the user 104's thumb and fingers are placed within a first half 508-1 of the user device 102. In some cases, one or more fingers are proximate to a top edge of the user device 102. A portion of the user 104's hand can be positioned behind the microphone 312-1. With this grip 600, the user 104's hand is closer to the microphone 312-1 than the microphone 312-2.

The ultrasonic sensor 202 generates range-power profiles 410-1 and 410-2, which are depicted in a graph 602. The range-power profile 410-1 is associated with the microphone 312-1 (e.g., associated with the ultrasonic receive signal 316-1). Likewise, the range-power profile 410-2 is associated with the microphone 312-2 (e.g., associated with the ultrasonic receive signal 316-2). Due to the grip 600, the range-power profile 410-1 has a higher power level than the range-power profile 410-2 within the range threshold 412. As an example, a peak power level of the range-power profile 410-1 can be greater than a peak power level of the range-power profile 410-2 by approximately 5 decibels (dB) or more (e.g., greater than approximately 10 dB). Based on this comparison, the hand-grip location detector 222 determines that a location of the grip 600 is at a first location associated with a top of the user device 102.

In FIG. 7, the user 104 has a grip 700, which is located towards a middle of the user device 102. For example, a portion of the user 104's fingers is within the first half 508-1 of the user device 102 and another portion of the user 104's fingers are within the second half 508-2 of the user device 102. A portion of the user 104's hand may not be positioned behind the microphones 312-1 and 312-2. With this grip 700, the user 104's hand is between the microphone 312-1 and the microphone 312-2.

A graph 702 depicts the range-power profiles 410-1 and 410-2. Due to the grip 700, the range-power profiles 410-1 and 410-2 have relatively similar power levels. As an example, peak power levels of the range-power profiles 410-1 and 410-2 can differ by less than approximately 5 dB (e.g., less than approximately 3 dB). Based on this comparison, the hand-grip location detector 222 determines that a location of the grip 700 is at a second location associated with a middle of the user device 102.

In FIG. 8, the user 104 has a grip 800, which is located towards a bottom of the user device 102. For example, a majority of the user 104's fingers are within the second half 508-2 of the user device 102. The user 104's thumb can be proximate to a center of the user device 102 (e.g., proximate to the plane 506). A portion of the user 104's hand, such as the palm, can be positioned behind the microphone 312-2. With this grip 800, the user 104's hand is closer to the microphone 312-2 than the microphone 312-1.

A graph 802 depicts the range-power profiles 410-1 and 410-2. Due to the grip 800, the range-power profiles 410-2 have a higher power level than the range-power profile 410-1 within the range threshold 412. As an example, a peak power level of the range-power profile 410-1 can be greater than a peak power level of the range-power profile 410-2 by approximately 5 decibels (dB) or more (e.g., greater than approximately 10 dB). Based on this comparison, the hand-grip location detector 222 determines that a location of the grip 800 is at a third location associated with a bottom of the user device 102.

Other grips not depicted include a two-handed grip with the user device 102 in a landscape orientation. In this case, the ultrasonic sensor 202 can detect the two-handed grip based on the peak power levels of the microphone 312-1 and 312-2 being relatively similar and greater than the power levels associated with the grip 700.

In general, the ultrasonic sensor 202 can detect the grip 600 based on the microphone 312-1 having a significantly greater peak power level than the microphone 312-2 within the range threshold 412. Also, the ultrasonic sensor 202 can detect the grip 800 based on the microphone 312-2 having a significantly greater peak power level than the microphone 312-1 within the range threshold 412. In these situations, an example of one peak power level being "significantly greater" than another peak power level can include power levels that are greater than approximately 3 dB or more. Additionally, the ultrasonic sensor 202 can detect the grip 700 based on the microphones 312-1 and 312-2 having relatively similar peak power levels within the range threshold 412. In this situation, an example of two peak power levels being "relatively similar" can include power levels that are within approximately 3 dB of each other.

The techniques for hand-grip location detection can be adjusted based on the quantity of microphones 312-1 to 312-M available and the positions of these microphones (M). Consider an example implementation in which the ultrasonic sensor 202 also uses the microphone 312-3 of FIG. 5, which is on a backside of the user device 102 (e.g., a side opposite the display 504). In this case, the ultrasonic sensor 202 can identify the grip 600 based on the microphones 312-1 and 312-3 having peak power levels that are significantly greater than the peak power level of the microphone 312-2 within the range threshold 412 (e.g., greater than approximately 3 dB). To identify the grip 700, the ultrasonic sensor 202 can determine if the microphone 312-3 has a significantly greater peak power level than the microphones 312-1 and 312-2 (e.g., greater than approximately 3 dB). The ultrasonic sensor 202 can identify the grip 800 based on the microphone 312-2 having a peak power level that is significantly greater than the peak power levels of the microphones 312-1 and 312-2. To detect a two-handed grip with the user device 102 in a landscape orientation, the ultrasonic sensor 202 can determine that the peak power levels of the microphones 312-1 to 312-3 are relatively similar and greater than the power threshold used to determine whether or not the user 104 is gripping the user device 102.

Another technique for hand-grip location detection can operate with a single speaker and a single microphone. In this case, the ultrasonic sensor 202 determines a distance associated with the user's hand and estimates the location of the grip based on this distance. In particular, the user's hand can be detected based on a range-power profile 410 having a peak amplitude that is above a predetermined power threshold and within the range threshold 412. The range associated with this peak amplitude represents, at least partially, the distance between the user's hand and the microphone. Assuming the ultrasonic sensor 202 uses the microphone 312-1, the ultrasonic sensor 202 can determine whether the user 104's grip 106 is the grip 600, 700, or 800 based on the measured distance being less than a first threshold, between the first threshold and a second threshold, or greater than the second threshold, respectively.

Example Method

FIG. 9 depicts an example method 900 for performing operations of hand-grip location detection using ultrasound. Method 900 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100 of FIG. 1, and entities detailed in FIG. 2 or 3, reference to which is made for example only. The techniques are not limited to performance by one entity or multiple entities operating on one device.

At 902, an ultrasonic transmit signal is transmitted using an ultrasonic sensor. For example, the ultrasonic sensor 202 transmits one of the ultrasonic transmit signals 314-1 to 314-S using a transducer 214, as shown in FIG. 3. In some implementations, the ultrasonic sensor 202 uses one of the speakers 310-1 to 310-S of the user device 102 to transmit the ultrasonic transmit signal.

At 904, a first ultrasonic receive signal is received via a first transducer of the ultrasonic sensor. The first ultrasonic receive signal comprises a first version of the ultrasonic transmit signal. For example, the ultrasonic sensor 202 receives the ultrasonic receive signal 316-1 using a first transducer 214, which can be the transducer that transmitted the ultrasonic transmit signal or a different transducer. In some implementations, the ultrasonic sensor 202 uses the microphone 312-1 shown in FIG. 5 to receive the ultrasonic receive signal 316-1. The ultrasonic receive signal 316-1 represents a first version of the ultrasonic transmit signal. In particular, the ultrasonic receive signal 316-1 can have a similar waveform as the ultrasonic transmit signal. However, the ultrasonic receive signal 316-1 can have a different amplitude, phase, and/or frequency caused by the ultrasonic transmit signal propagating within the environment to the first transducer.

At 906, a second ultrasonic receive signal is received via a second transducer of the ultrasonic sensor. The second ultrasonic receive signal comprises a second version of the ultrasonic transmit signal. For example, the ultrasonic sensor 202 receives the ultrasonic receive signal 316-1 using a second transducer 214. In some implementations, the ultrasonic sensor 202 uses the microphone 312-2 shown in FIG. 5 to receive the ultrasonic receive signal 316-2. The ultrasonic receive signal 316-2 represents a second version of the ultrasonic transmit signal. In particular, the ultrasonic receive signal 316-2 can have a similar waveform as the ultrasonic transmit signal. However, the ultrasonic receive signal 316-2 can have a different amplitude, phase, and/or frequency caused by the ultrasonic transmit signal propagating within the environment to the second transducer.

At 908, a power level of the first ultrasonic receive signal is compared to a power level of the second ultrasonic receive signal. For example, the hand-grip location detector 222 of the ultrasonic sensor 202 compares the power level of the first ultrasonic receive signal 316-1 to a power level of the second ultrasonic receive signal 316-2. In some implementations, the hand-grip location detector 222 can perform this comparison based on range-power profiles 410-1 and 410-2 associated with these ultrasonic receive signals 316-1 and 316-2. In other implementations, the hand-grip location detector 222 can perform this comparison based on amplitudes or signal-to-noise ratios associated with the ultrasonic receive signals 316-1 and 316-2. In general, this comparison is performed across certain ranges, which correspond to ranges associated with a set of grips (e.g., ranges within the range threshold 412).

At 910, a location of a user's grip on a user device that includes the ultrasonic sensor is determined based on the comparison. For example, the ultrasonic sensor 202 determines that the hand-grip location 318 represents the grip 600 located at a top of the user device 102, the grip 700 located at a middle of the user device 102, or the grip 800 located at a bottom of the user device 102. The ultrasonic sensor 202 can further identify if the hand-grip location 318 corresponds to a two-handed grip with two hands proximate to two transducers 214 of the ultrasonic sensor 202 that are located on opposite sides of the user device 102. In general, the method 900 can be adapted to suit any quantity of transducers used by the ultrasonic sensor to receive versions of the ultrasonic transmits signal.

Example Computing System

Figure 10:
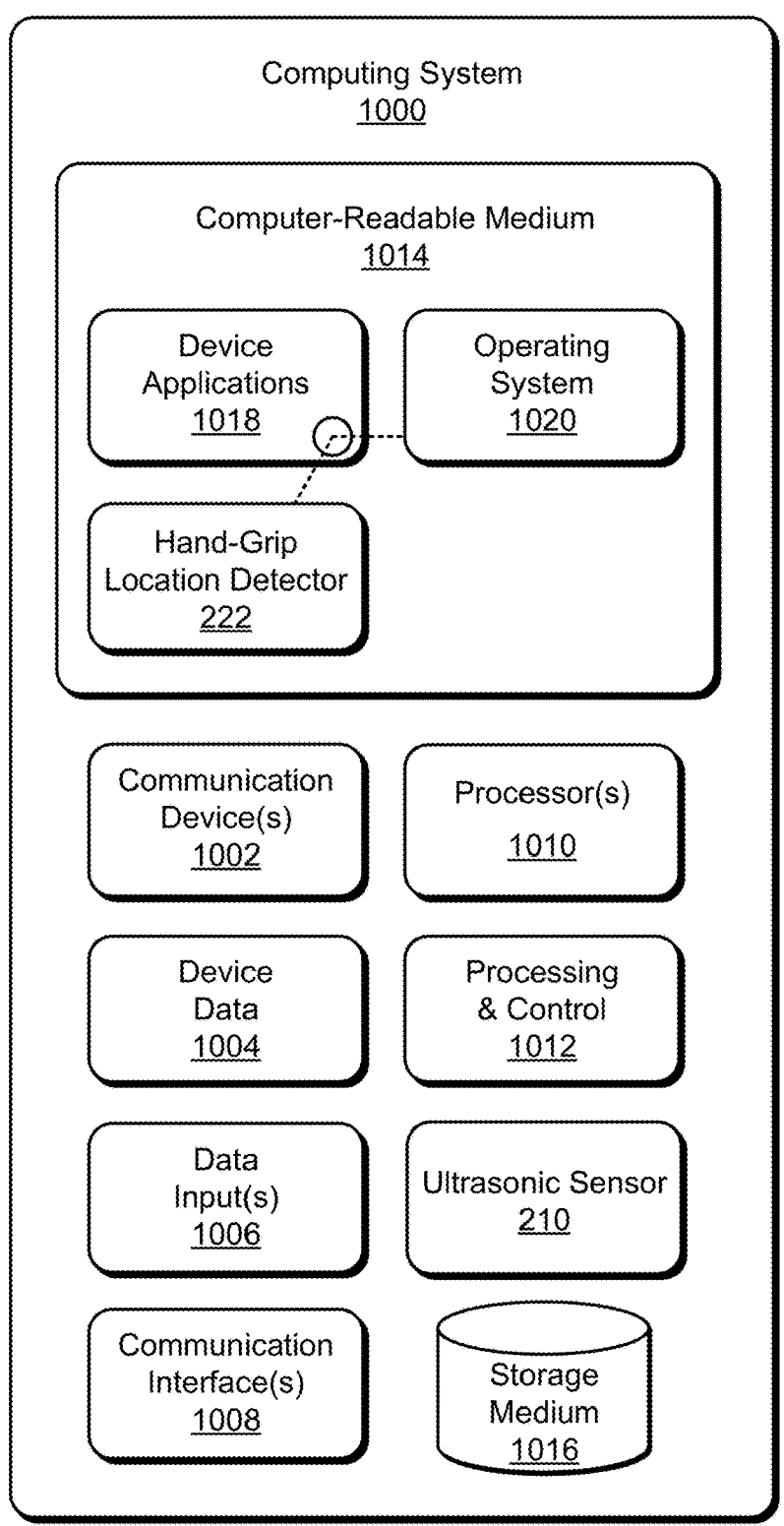
FIG. 10 illustrates an example computing system embodying, or in which techniques may be implemented that enable use of, an ultrasonic sensor capable of performing hand-grip location detection using ultrasound.

FIG. 10 illustrates various components of an example computing system 1000 that can be implemented as any type of client, server, and/or computing device as described with reference to the previous FIG. 2 to perform hand-grip location detection using ultrasound.

The computing system 1000 includes communication devices 1002 that enable wired and/or wireless communication of device data 1004 (e.g., received data, data that is being received, data scheduled for broadcast, or data packets of the data). The device data 1004 or other device content can include configuration settings of the device, media content stored on the device, and/or information associated with a user of the device. Media content stored on the computing system 1000 can include any type of audio, video, and/or image data. The computing system 1000 includes one or more data inputs 1006 via which any type of data, media content, and/or inputs can be received, such as human utterances, user-selectable inputs (explicit or implicit), messages, music, television media content, recorded video content, and any other type of audio, video, and/or image data received from any content and/or data source.

The computing system 1000 also includes communication interfaces 1008, which can be implemented as any one or more of a serial and/or parallel interface, a wireless interface, any type of network interface, a modem, and any other type of communication interface. The communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, and the like), which process various computer-executable instructions to control the operation of the computing system 1000 and to enable techniques for, or in which can be embodied, hand-grip location detection using ultrasound. Alternatively or in addition, the computing system 1000 can be implemented with any one or combination of hardware, firmware, or fixed logic circuitry that is implemented in connection with processing and control circuits which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes a computer-readable media 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016 and at least one ultrasonic sensor 202.

The computer-readable media 1014 provides data storage mechanisms to store the device data 1004, as well as various device applications 1018 and any other types of information and/or data related to operational aspects of the computing system 1000. For example, an operating system 1020 can be maintained as a computer application with the computer-readable media 1014 and executed on the processors 1010. The device applications 1018 may include a device manager, such as any form of a control application, software application, signal-processing and control module, code that is native to a particular device, a hardware abstraction layer for a particular device, and so on.

The device applications 1018 also include any system components, engines, or managers to implement hand-grip location detection using ultrasound. In this example, the device applications 1018 include the hand-grip location detector 222.

CONCLUSION

Although techniques using, and apparatuses including, hand-grip location detection using ultrasound have been described in language specific to features and/or methods, it is to be understood that the subject of the appended claims is not necessarily limited to the specific features or methods described. Rather, the specific features and methods are disclosed as example implementations of hand-grip location detection.

Some Examples are described below.

Example 1: A method for hand-grip location detection using ultrasound, the method comprising:

transmitting an ultrasonic transmit signal using an ultrasonic sensor:

receiving, via a first transducer of the ultrasonic sensor, a first ultrasonic receive signal, the first ultrasonic receive signal comprising a first version of the ultrasonic transmit signal:

receiving, via a second transducer of the ultrasonic sensor, a second ultrasonic receive signal, the second ultrasonic receive signal comprising a second version of the ultrasonic transmit signal:

comparing a power level of the first ultrasonic receive signal to a power level of the second ultrasonic receive signal; and determining, based on the comparison, a location of a user's grip on a device that includes the ultrasonic sensor.

Example 2: The method of example 1, wherein the comparing comprises comparing a first peak power level of the first ultrasonic receive signal to a second peak power level of the second ultrasonic receive signal, the first peak power level and the second peak power level associated with ranges that are less than a range threshold.

Example 3: The method of example 2, wherein the range threshold is approximately 20 centimeters.

Example 4: The method of any preceding example, wherein:

the comparing comprises determining that the power level of the first ultrasonic receive signal is greater than the power level of the second ultrasonic receive signal; and the determining of the location of the user's grip comprises determining that the location of the user's grip is closer to the first transducer than the second transducer.

Example 5: The method of example 4, wherein the determining that the power level of the first ultrasonic receive signal is greater than the power level of the second ultrasonic receive signal comprises determining that the power level of the first ultrasonic receive signal is at least 3 decibels greater than the power level of the second ultrasonic receive signal.

Example 6: The method of any one of examples 1 to 3, wherein:

the comparing comprises determining that the power level of the second ultrasonic receive signal is greater than the power level of the first ultrasonic receive signal; and the determining of the location of the user's grip comprises determining that the location of the user's grip is closer to the second transducer than the first transducer.

Example 7: The method of any one of examples 1 to 3, wherein:

the comparing comprises determining that the power level of the first ultrasonic receive signal is relatively similar to the power level of the second ultrasonic receive signal; and the determining of the location of the user's grip comprises determining that the location of the user's grip is located between the first transducer and the second transducer.

Example 8: The method of example 7, wherein the determining that the power level of the first ultrasonic receive signal is relatively similar to the power level of the second ultrasonic receive signal comprises determining that a difference between the first peak power level and the second peak power level is approximately 3 decibels or less.

Example 9: The method of any one of examples 1 to 3, further comprising:

determining that the power levels of the first and second ultrasonic receive signals are higher than a threshold, wherein:

the comparing comprises determining that the power level of the first ultrasonic receive signal is relatively similar to the power level of the second ultrasonic receive signal; and the determining of the location of the user's grip comprises determining that the user's grip includes a two-handed grip with a first hand proximate to the first transducer and a second hand proximate to the second transducer.

Example 10: The method of any preceding example, further comprising:

receiving, via a third transducer of the ultrasonic sensor, a third ultrasonic receive signal, the third ultrasonic receive signal comprising a third version of the ultrasonic transmit signal, wherein:

the comparing comprises comparing the power levels of the first, second, and third ultrasonic receive signals.

Example 11: The method of example 10, wherein:

the comparing comprises determining that the power level of the first ultrasonic receive signal and the power level of the third ultrasonic receive signal are greater than the power level of the second ultrasonic receive signal; and the determining of the location of the user's grip comprises determining that the location of the user's grip is closer to the first transducer and the third transducer than the second transducer.

Example 12: The method of example 10, wherein:

the comparing comprises determining that the power level of the second ultrasonic receive signal is greater than the power levels of the first and third ultrasonic receive signals: and the determining of the location of the user's grip comprises determining that the location of the user's grip is closer to the second transducer than the first transducer or the third transducer.

Example 13: The method of example 10, wherein:

the comparing comprises determining that the power level of the third ultrasonic receive signal is greater than the power levels of the first and second ultrasonic receive signals; and the determining of the location of the user's grip comprises determining that the location of the user's grip is closer to the third transducer than the first transducer or the second transducer.

Example 14: The method of any preceding example, further comprising:

determining, based on the location of the user's grip, a location on a user interface of the device at which to present a prompt: and presenting the prompt at said determined location.

Example 15: The method of any preceding example, further comprising:

enabling and/or disabling one or more haptic sensors within the device based on the location of the user's grip.

Example 16: The method of any preceding example, further comprising:

changing the operation of one or more components within the device based on the location of the user's grip.

Example 17: An apparatus comprising:

an ultrasonic sensor configured to perform any one of the methods of examples 1-16.

Example 18: The apparatus of example 17, wherein:

a plane bisects the apparatus in half to delineate a first half of the apparatus and a second half of the apparatus:

the first transducer of the ultrasonic sensor is positioned within the first half of the apparatus; and the second transducer of the ultrasonic sensor is positioned within the second half of the apparatus.

Example 19: The apparatus of example 18, wherein the first transducer and the second transducer are positioned on a same planar surface of the apparatus.

Example 20: The apparatus of example 19, further comprising:

a display positioned on the same planar surface of the apparatus as the first transducer and the second transducer.

Example 21: The apparatus of example 19 or 20, wherein a third transducer of the ultrasonic sensor is positioned on another planar surface of the apparatus that is approximately parallel to the planar surface.

Example 22: The apparatus of any one of examples 17-21, wherein:

the apparatus comprises a first microphone and a second microphone;

the first transducer of the ultrasonic sensor comprises the first microphone; and the second transducer of the ultrasonic sensor comprises the second microphone.

Example 23: A computer-readable storage medium comprising instructions that, responsive to execution by a processor, cause the ultrasonic sensor to perform any one of the methods of examples 1-16.

The invention claimed is:

1. A method for hand-grip location detection using ultrasound, the method comprising:

transmitting an ultrasonic transmit signal using an ultrasonic sensor, the ultrasonic transmit signal propagating in an environment that is external to a device that includes the ultrasonic sensor;

receiving, via a first transducer of the ultrasonic sensor, a first ultrasonic receive signal, the first ultrasonic receive signal comprising a first version of the ultrasonic transmit signal;

receiving, via a second transducer of the ultrasonic sensor, a second ultrasonic receive signal, the second ultrasonic receive signal comprising a second version of the ultrasonic transmit signal;

comparing a power level of the first ultrasonic receive signal to a power level of the second ultrasonic receive signal; and determining, based on the comparison, a location of a user's grip on the device that includes the ultrasonic sensor.

2. The method of claim 1, wherein the comparing comprises comparing a first peak power level of the first ultrasonic receive signal to a second peak power level of the second ultrasonic receive signal, the first peak power level and the second peak power level associated with ranges that are less than a range threshold.

3. The method of claim 2, wherein the range threshold is 20 centimeters or less.

4. The method of claim 1, wherein:

the comparing comprises determining that the power level of the first ultrasonic receive signal is greater than the power level of the second ultrasonic receive signal; and the determining of the location of the user's grip comprises determining that the location of the user's grip is closer to the first transducer than the second transducer.

5. The method of claim 4, wherein the determining that the power level of the first ultrasonic receive signal is greater than the power level of the second ultrasonic receive signal comprises determining that the power level of the first ultrasonic receive signal is at least 3 decibels greater than the power level of the second ultrasonic receive signal.

6. The method of claim 1, wherein:

the comparing comprises determining that the power level of the second ultrasonic receive signal is greater than the power level of the first ultrasonic receive signal; and the determining of the location of the user's grip comprises determining that the location of the user's grip is closer to the second transducer than the first transducer.

7. The method of claim 1, wherein:

the comparing comprises determining that the power level of the first ultrasonic receive signal is similar to the power level of the second ultrasonic receive signal; and the determining of the location of the user's grip comprises determining that the location of the user's grip is located between the first transducer and the second transducer.

8. The method of claim 7, wherein the determining that the power level of the first ultrasonic receive signal is similar to the power level of the second ultrasonic receive signal comprises determining that a difference between a first peak power level of the first ultrasonic receive signal and a second peak power level of the second ultrasonic receive signal is 3 decibels or less.

9. The method of claim 1, wherein:

determining that the power levels of the first and second ultrasonic receive signals are higher than a threshold, wherein:

the comparing comprises determining that the power level of the first ultrasonic receive signal is similar to the power level of the second ultrasonic receive signal; and the determining of the location of the user's grip comprises determining that the user's grip includes a two-handed grip with a first hand proximate to the first transducer and a second hand proximate to the second transducer.

10. The method of claim 1, further comprising:

receiving, via a third transducer of the ultrasonic sensor, a third ultrasonic receive signal, the third ultrasonic receive signal comprising a third version of the ultrasonic transmit signal, wherein:

the comparing comprises comparing the power levels of the first, second, and third ultrasonic receive signals.

11. The method of claim 10, wherein:

the comparing comprises determining that the power level of the first ultrasonic receive signal and the power level of the third ultrasonic receive signal are greater than the power level of the second ultrasonic receive signal; and the determining of the location of the user's grip comprises determining that the location of the user's grip is closer to the first transducer and the third transducer than the second transducer.

12. The method of claim 10, wherein:

the comparing comprises determining that the power level of the second ultrasonic receive signal is greater than the power levels of the first and third ultrasonic receive signals; and the determining of the location of the user's grip comprises determining that the location of the user's grip is closer to the second transducer than the first transducer or the third transducer.

13. The method of claim 10, wherein:

the comparing comprises determining that the power level of the third ultrasonic receive signal is greater than the power levels of the first and second ultrasonic receive signals; and the determining of the location of the user's grip comprises determining that the location of the user's grip is closer to the third transducer than the first transducer or the second transducer.

14. The method of claim 1, further comprising:

determining, based on the location of the user's grip, a location on a user interface of the device at which to present a prompt; and presenting the prompt at said determined location.

15. The method of claim 1, further comprising:

enabling or disabling one or more haptic sensors within the device based on the location of the user's grip.

16. The method of claim 1, further comprising:

changing an operation of one or more components within the device based on the location of the user's grip.

17. An apparatus comprising an ultrasonic sensor, the apparatus configured to:

transmit an ultrasonic transmit signal using the ultrasonic sensor, the ultrasonic transmit signal propagating in an environment that is external to the apparatus;

receive, via a first transducer of the ultrasonic sensor, a first ultrasonic receive signal, the first ultrasonic receive signal comprising a first version of the ultrasonic transmit signal;

receive, via a second transducer of the ultrasonic sensor, a second ultrasonic receive signal, the second ultrasonic receive signal comprising a second version of the ultrasonic transmit signal;

compare a power level of the first ultrasonic receive signal to a power level of the second ultrasonic receive signal; and determine, based on the comparison, a location of a user's grip on the apparatus.

18. The apparatus of claim 17, wherein:

a plane bisects the apparatus in half to delineate a first half of the apparatus and a second half of the apparatus;

the first transducer of the ultrasonic sensor is positioned within the first half of the apparatus; and the second transducer of the ultrasonic sensor is positioned within the second half of the apparatus.

19. The apparatus of claim 18, wherein the first transducer and the second transducer are positioned on a same planar surface of the apparatus.

20. The apparatus of claim 19, further comprising:

a display positioned on the same planar surface of the apparatus as the first transducer and the second transducer.

* * * * *